(12) United States Patent
Sinha et al.

(10) Patent No.: US 7,587,143 B2
(45) Date of Patent: Sep. 8, 2009

(54) SYSTEM AND METHOD FOR IMPROVED COHERENT PULSED COMMUNICATION SYSTEM HAVING SPECTRALLY SHAPED PULSES

(75) Inventors: Mohit Sinha, Bangalore (IN); Debabrata Goswami, Mumbai (IN)

(73) Assignee: Sasken Communication Technologies Ltd. (IN)

( * ) Notice: Subject to any disclaimer, the term of this patent is extended or adjusted under 35 U.S.C. 154(b) by 368 days.

(21) Appl. No.: 10/202,802

(22) Filed: Jul. 24, 2002

(65) Prior Publication Data

US 2004/0208613 A1  Oct. 21, 2004

Related U.S. Application Data

(60) Provisional application No. 60/307,531, filed on Jul. 24, 2001.

(51) Int. Cl.
  H04B 10/00 (2006.01)
  H04B 10/04 (2006.01)
  H04B 10/12 (2006.01)
(52) U.S. Cl. .................. 398/159; 398/162; 398/193
(58) Field of Classification Search .............. 398/159, 398/162, 193
  See application file for complete search history.

(56) References Cited

U.S. PATENT DOCUMENTS

| 5,225,922 | A | * | 7/1993 | Chraplyvy et al. ......... 398/94 |
| 5,526,171 | A | | 6/1996 | Warren |
| 5,828,474 | A | | 10/1998 | Prucnal et al. |
| 5,877,879 | A | * | 3/1999 | Naito ...................... 398/91 |
| 5,907,421 | A | | 5/1999 | Warren et al. |
| 6,195,484 | B1 | | 2/2001 | Brennan, III et al. |
| 6,411,417 | B1 | * | 6/2002 | Roberts et al. .......... 398/177 |
| 6,522,436 | B2 | | 2/2003 | Roberts et al. |
| 6,959,149 | B2 | * | 10/2005 | Bragg et al. ............... 398/26 |
| 7,321,612 | B2 | * | 1/2008 | Tonietto et al. .......... 375/219 |
| 2002/0036813 | A1 | | 3/2002 | Roberts et al. |
| 2002/0080436 | A1 | | 6/2002 | Hait |

OTHER PUBLICATIONS

"Optical Communications" by M. Sibley, MacMillan, 1990, pp. 9-10.*

* cited by examiner

Primary Examiner—Shi K Li
(74) Attorney, Agent, or Firm—Husch Blackwell Sanders Welsh & Katz

(57) ABSTRACT

Disclosed are systems and methods for improving communication in an optical communication system having spectrally shaped pulses. Embodiments of the systems and methods include sending a first spectrally shaped pulse over a channel connecting a transmitter and a receiver. Then, comparing the spectrally shaped pulse received at the receiver to a predetermined spectrally shaped pulse. The systems and methods further include obtaining a preemphasis coefficient that describes the difference between the spectrally shaped pulse received at the receiver to the predetermined spectrally shaped pulse by utilizing a mathematical description of $C(\omega_k) e^{j(\gamma\beta(\omega_k))}$ and multiplying a second spectrally shaped pulse with the preemphasis coefficient before sending the second spectrally shaped pulse to the receiver.

2 Claims, 5 Drawing Sheets

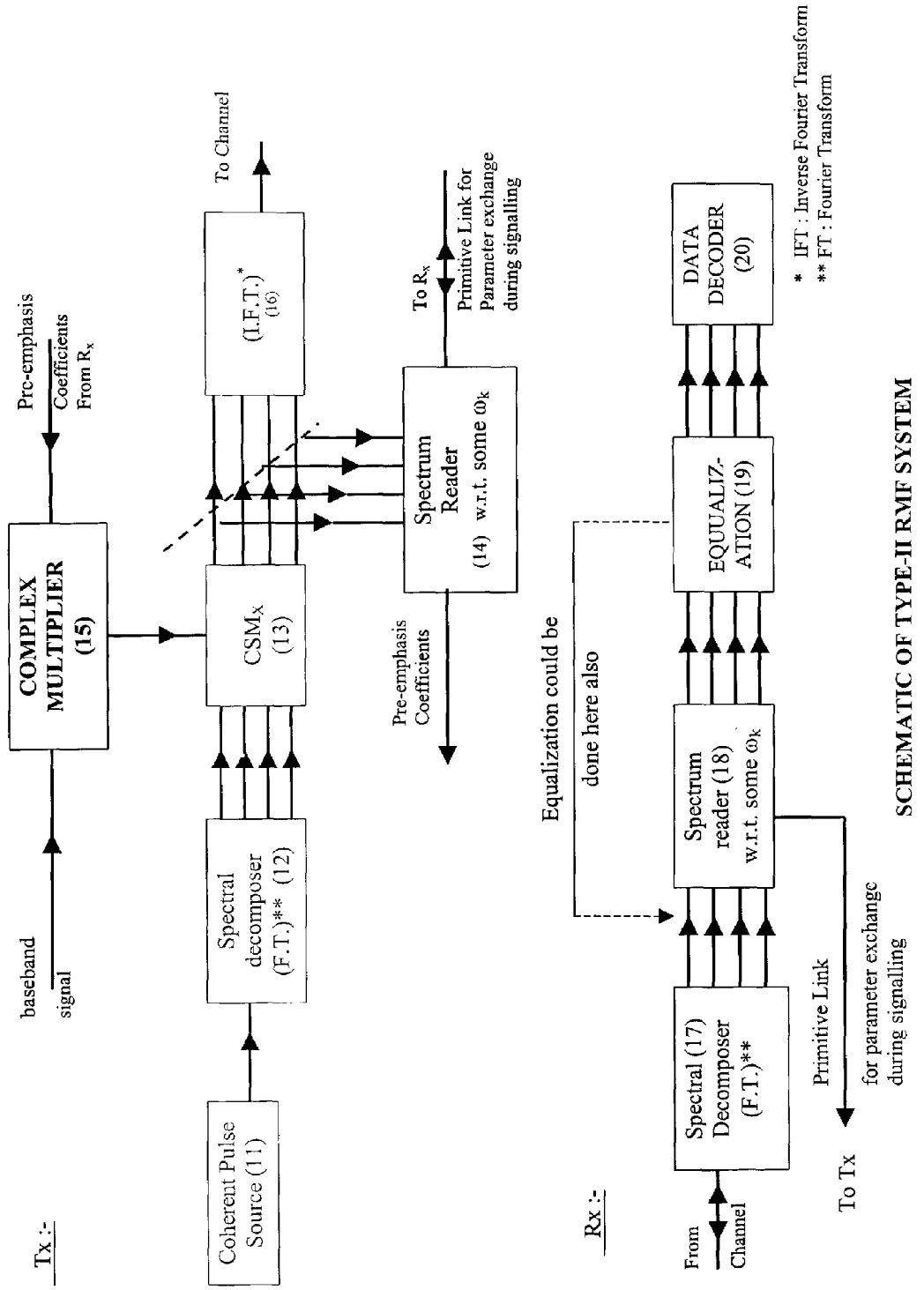

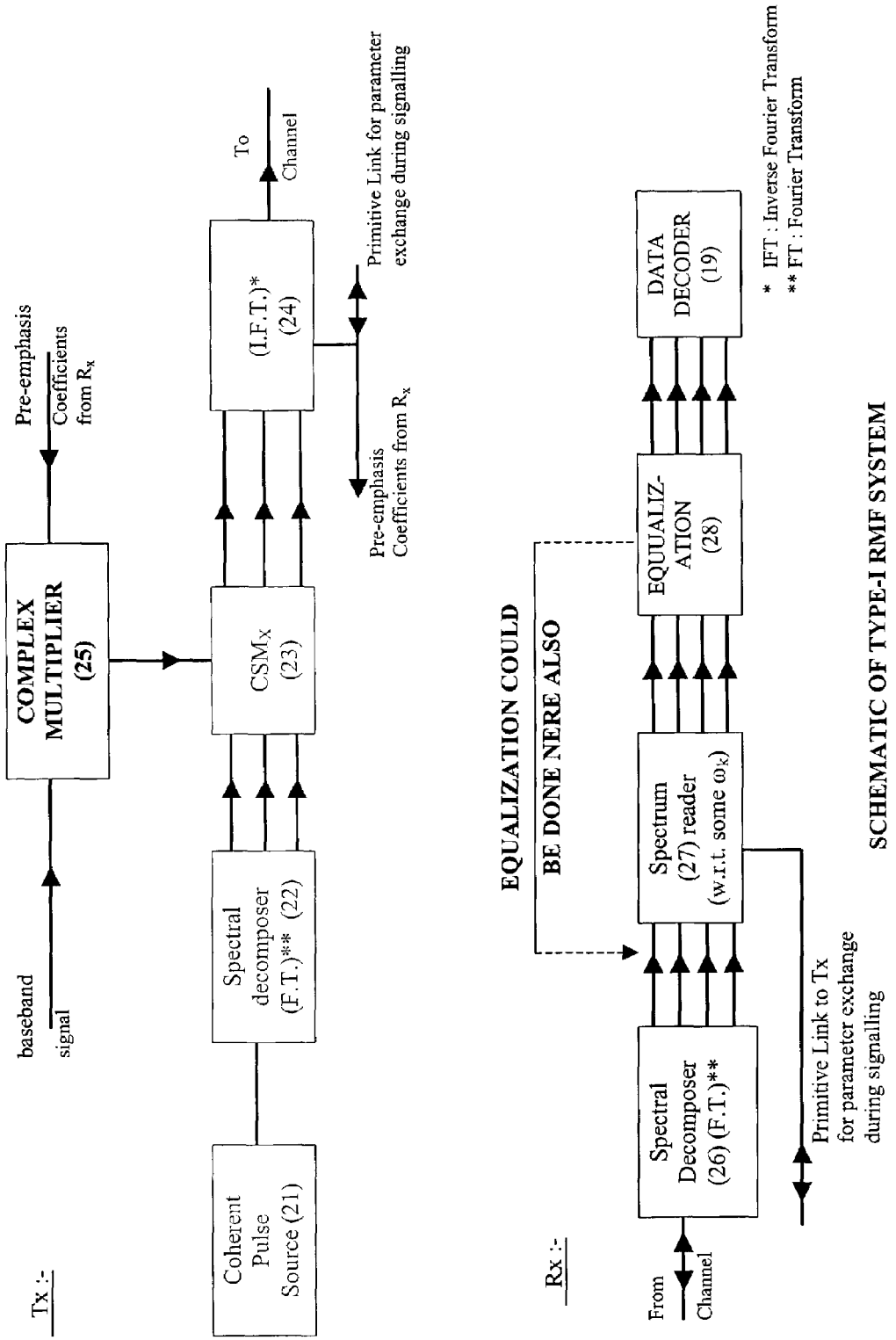

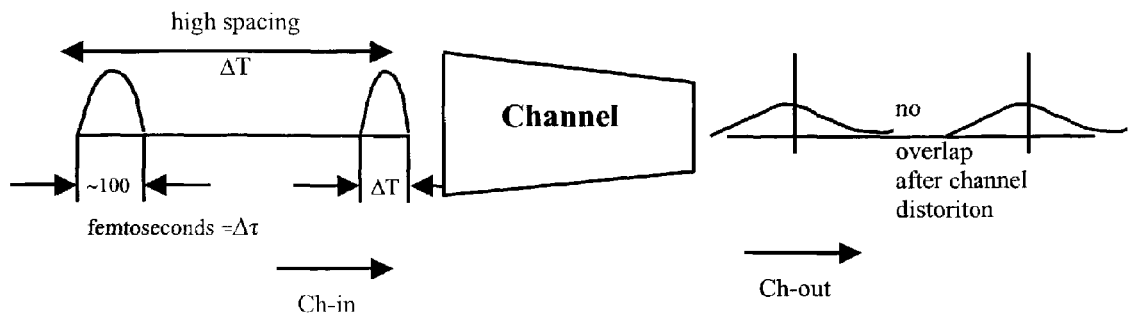
Figure-4 : TRAINING PULSES FOR TYPE-I SYSTEMS
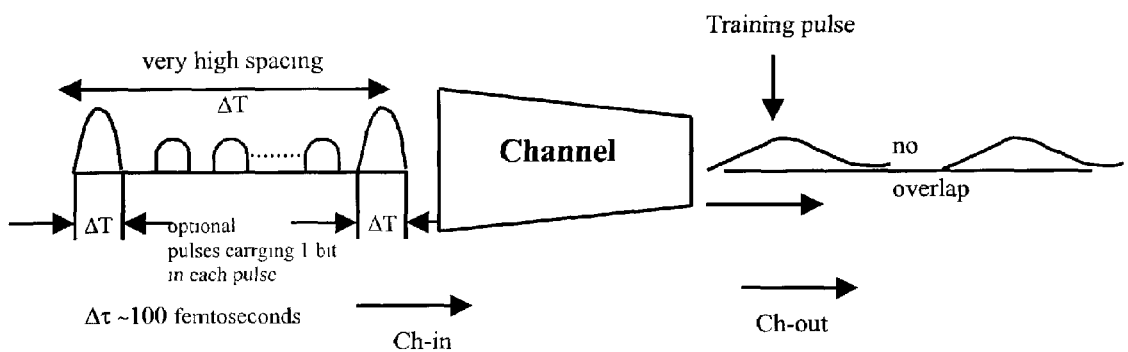
Figure-5 : TRAINING PULSES FOR TYPE-II SYSTEMS

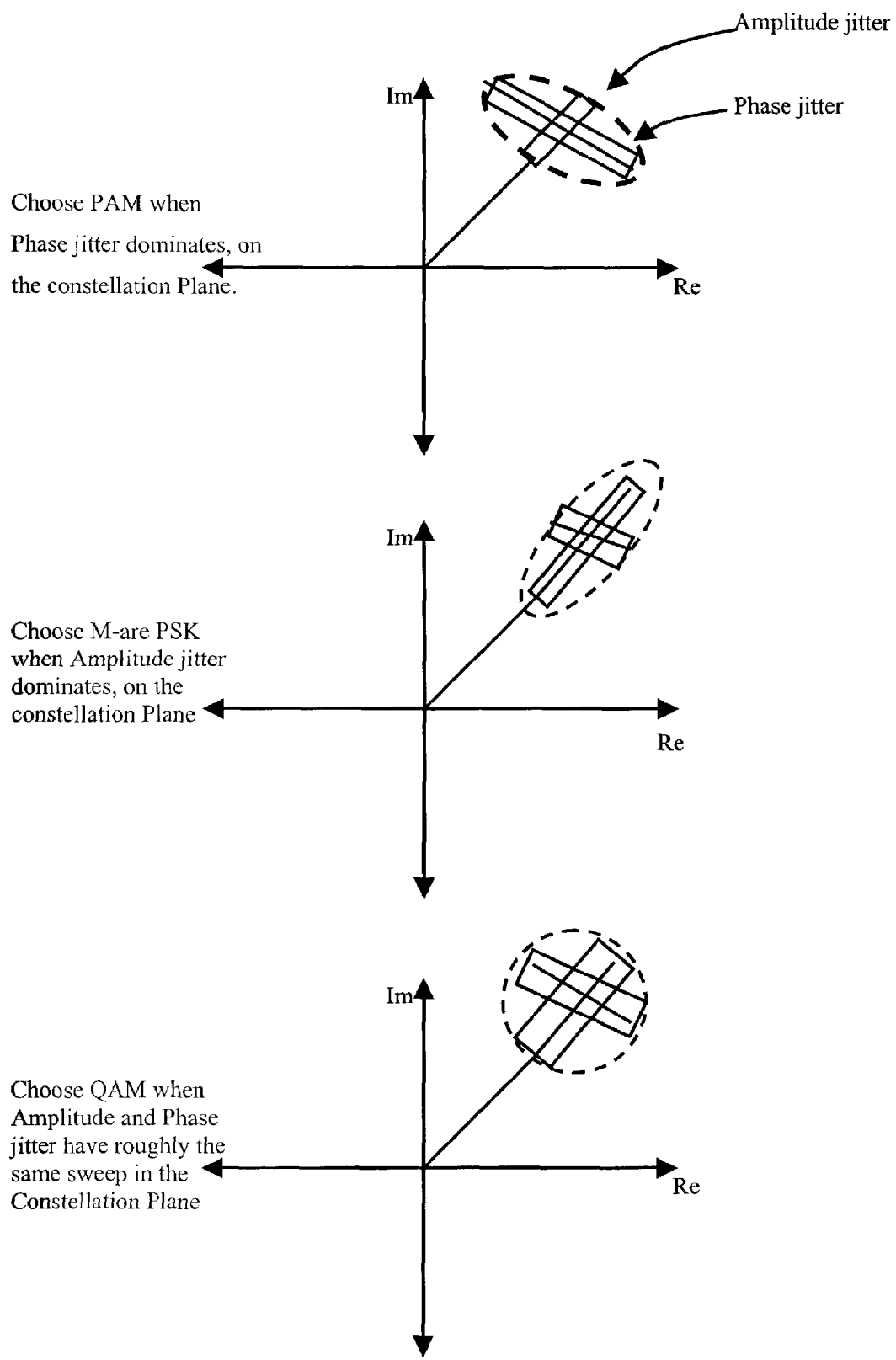
Figure-6 : CHOICE OF MODULATION SCHEME

SYSTEM AND METHOD FOR IMPROVED COHERENT PULSED COMMUNICATION SYSTEM HAVING SPECTRALLY SHAPED PULSES

RELATED APPLICATION

This patent application claims the benefit of the filing date of U.S. Provisional patent application Ser. No. 60/307,531 filed Jul. 24, 2001 and entitled RELATIVE MULTI-FREQUENCY (RMF)—METHOD AND ALLIED APPARATUS FOR ACHIEVING COHERENT DETECTION (QAM/MARY-PSK ETC) VIA PRE-EMPHASIS AND/OR EQUALIZATION IN COHERENT PULSED COMMUNICATION SYSTEMS EMPLOYING SPECTRALLY SHAPED PULSES; the contents of which are hereby incorporated by reference.

FIELD OF INVENTION

This invention relates to optical communication systems in which a spectrally shaped pulse modulates data.

BACKGROUND

Optical pulse shaping is a technique used to control the quantum states of atoms and molecules of a coherent pulsed laser by application of an electric field with phases and amplitudes at selected frequencies. By controlling the amplitudes and phases of the frequencies of the laser, optical communication of spectrally shaped pulses is possible. Current optical communication technology is throughput limited because of the inability to utilize high-speed modulation techniques, including Multi-bit Quadrature Amplitude Modulation ("QAM") and M-ary Phase Shift Keying. Using such high-speed modulation techniques requires the optical communication technology to have the ability to have a local carrier phase reference at a receiver synchronized to a remote carrier of a transmitter across a plurality of pulses. Because synchronization of signals at the receiver with the transmitter is problematic in optical communication with spectrally shaped pulses, not requiring synchronization of signals to achieve higher communication throughput is desired. Accordingly, an improved coherent optical communication system having spectrally shaped pulses is needed.

SUMMARY

Disclosed are systems and methods for improving communication in an optical communication system having spectrally shaped pulses. Embodiments of the systems and methods include sending a first spectrally shaped pulse over a channel connecting a transmitter and a receiver. Then, comparing the spectrally shaped pulse received at the receiver to a predetermined spectrally shaped pulse. The systems and methods further include obtaining a preemphasis coefficient that describes the difference between the spectrally shaped pulse received at the receiver to the predetermined spectrally shaped pulse by utilizing a mathematical description of $C(\omega_k) e^{j(\gamma\beta(\omega_k))}$ and multiplying a second spectrally shaped pulse with the preemphasis coefficient before sending the second spectrally shaped pulse to the receiver.

BRIEF DESCRIPTION OF THE DRAWINGS

FIG. 2 is a block diagram illustrating the function blocks of another exemplary embodiment of the invention.

FIG. 3 is a block diagram illustrating the functional blocks of an exemplary embodiment of the invention.

FIG. 4 is a block diagram illustrating the function blocks of a training diagram for an exemplary embodiment of the invention.

FIG. 5 is a block diagram illustrating the functional blocks of another training diagram for another exemplary embodiment of the invention.

FIG. 6 is a block diagram illustrating the functional blocks of an exemplary embodiment of the invention.

GLOSSARY OF ABBREVIATIONS USED IN THIS DOCUMENT

Figure 1:
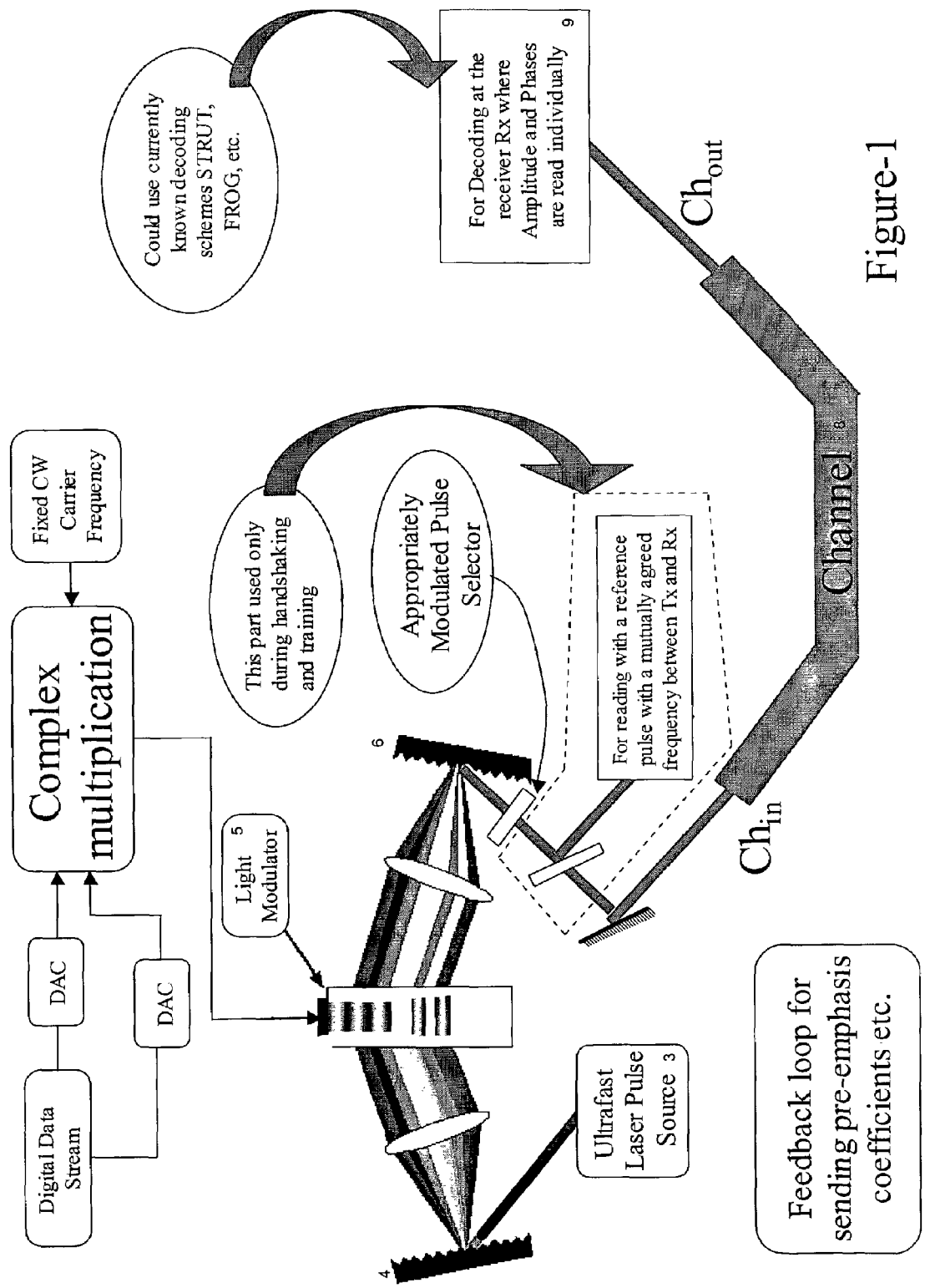
FIG. 1 is a block diagram illustrating the functional blocks of an exemplary embodiment of the invention.

AOM: Acousto Optic Modulator
LCM: Liquid Crystal Modulator
ISI: Inter Symbol Interference
STRUT: Spectrally and Temporally Resolved Up conversion Technique
FROG: Frequency Resolved Optical Gating
QAM: Quadrature Amplitude Modulation
PAM: Pulse Amplitude Modulation
Mary-PSK: M-ary Phase Shift Keying
OSA: Optical Spectrum Analyzer
RMS: Root Mean Square
TDM: Time Division Multiplexing
WDM: Wavelength Division Multiplexing

DETAILED DESCRIPTION OF THE INVENTION

Shown in FIG. 1 is an exemplary embodiment of a high-speed optical communication transceiver for achieving an improved coherent optical communication system having spectrally shaped pulses. An ultrafast laser pulse source 3 generates an ultrashort laser. The ultrashort laser is spectrally dispersed and time stretched by a grating-lens combination 4 to generate an optical pulse. A light modulator 5 amplitude modulates the optical pulse in the spectral domain at different resolved frequencies to time stretch the optical pulse. Then, the optical pulse is passed through another lens-grating combination 6 to convert the optical pulse back to a time-domain signal that is also spectrally shaped. This time-domain signal is sent over the communication channel 8 to a receiver 9. At the receiver 9, the received time-domain signal is read to determine the data modulated.

The communication channel is commonly a fiber optic cable, but may also include a wireless optical connection. The disclosed invention may be applicable to any pulsed communication system employing pulses having relative phase and amplitude properties in spectral components where the resolved spectral frequencies of the pulses can be directly modulated in the frequency-domain by complex symbols (a+j*b) using a Complex Spectral Modulator (henceforth referred to as CSMx). Examples of such pulsed communication systems include systems based upon microwave and/or radio wave frequencies, free-space optical communication systems using visual and/or infrared frequencies, and pulsed sonar systems.

The other requirements are that the resolved spectral frequencies of the pulses can be directly modulated in the frequency-domain by complex symbols (a+j*b) using a Complex Spectral Modulator (henceforth referred to as CSMx) and apparatus for reading the Amplitudes and relative phases with respect to the phase of any one of the frequency components of the pulse. An exemplary embodiment is a coherent pulsed optical communication system.

Preemphasis is shown as follows. Given two pulses P and P' from a coherent source, where pulse P has phases $\phi(\omega_1)$, $\phi(\omega_2), \ldots, \phi(\omega_n)$ and Pulse P' has phases $\phi(\omega_1)'$, $\phi(\omega_2)', \ldots \phi(\omega_n)'$ with respect to some external constant phase signal, at resolved frequencies $\omega_1, \omega_2, \ldots \omega_n$. The approximate constancy of relative phases between the frequency components of the two pulses at the source is as follows:

$$(\phi(\omega_j)-\phi(\omega_k))\sim(\phi(\omega_j)'-\phi(\omega_k)') \text{ for all } j,k \in (1,n)$$

Such a constraint may not be as stringent as in the prior art system of synchronizing a local carrier phase to a carrier phase of the transmitted signal. Even with such a constraint, pre-emphasis, equalization and coherent modulation/demodulation techniques may be achieved. As in prior art systems, an exemplary embodiment also requires that the average amplitude spectrum of the pulse does not change across pulses and that the amplitude jitter is not relatively large compared to the average amplitude.

For phase estimation we use the fact that the phases of the frequency components of a pulse can be read with respect to the phase of an arbitrary frequency component chosen from them using interferometric techniques. As is known in the art, commonly used interferometric techniques include STRUT and FROG. Channel estimation is done at the receiver using training sequences modulated on pulses and the received pulses read using a predetermined reference frequency.

Utilizing a training procedure including the steps of sending a predetermined sequence modulated on pulses over the channel 8 to a receiver 9 and comparing the received signal to the sent predetermined sequence gives an estimate of the channel phase distortion. By utilizing a training procedure a calculation of relative phase distortions at various frequencies with respect to the channel phase distortion at the reference frequency is obtained.

When pre-emphasis coefficients based on such a relative channel estimate are applied to a pulse loaded with data at the Transmitter 10 then the output at a dispersive communication channel will have much less time spread leading to denser packing of multiple TDM channels and better SNR at the respective frequency components leading to higher bit-loading in currently claimed AM based systems Reading of the phases of different frequency components of a pulse at the receiver done with respect to the phase of the same reference frequency as used during channel estimation, the phase of the data point is obtained. Because the relative phases is a constant, every pulse may be treated mathematically as an independent unit for decoding phase information with respect to the phase of some fixed frequency used during channel estimation. Further, amplitudes can be read using existing incoherent detection techniques.

The term relative multi-frequency (as used herein "RMF") refers to signal processing performed pulse by pulse and relative to the phase of a reference frequency.

Novel Elements of Invention

The usage of Type-II pre-emphasis at the Transmitter 10 to enhance SNR at the Receiver 9, thus leading to higher bit-loading for any conventional (or otherwise) modulation technique at frequency components which are attenuated highly in the communication channel The usage of Type-I pre-emphasis at the Transmitter 10 to enhance SNR at the Receiver 9, thus leading to higher bit-loading for any conventional (or otherwise) modulation technique at frequency components which are attenuated highly in the communication channel The usage of Type-II pre-emphasis/Equalization at the Transmitter 10 to reduce pulse-broadening at the channel output, thus leading to denser packing of TDM pulses on the timeline, when pulses from many such systems are being Time division Multiplexed.

The usage of Type-I pre-emphasis/Equalization at the Transmitter 10 to reduce pulse-broadening at the channel output in Type-I systems by suitably spectrally shaping the baseband data spectrum, thus leading to denser packing of TDM pulses on the timeline, when pulses from many such systems are being Time division Multiplexed. The exact description is presented in Type-I systems analysis in the section on "detailed description of the Invention" in this document.

The application of Pre-emphasis/Equalization techniques (Type-I or Type-II) to establish an ultra high-speed optical link without compromising on the linearity of the medium, by cutting down on the pulse power and/or the number of frequencies loaded with data in a pulse (others being attenuated highly), still maintaining proximity to the currently claimed figures for bits loaded per pulse (as more bits can be loaded per frequency subchannel in a pulse using the said techniques) coupled with a denser TDM packing of such pulses achieved through pre-emphasis/Equalization. (Peak pulse power may trigger nonlinearity problems in the channel and having a string of closely spaced pulses each with a lower power will be a step towards avoiding nonlinearity).

The usage of the Inverse Fourier Transform (IFT, i.e. the corresponding Time series) of Spectral Channel Pre-emphasis coefficients (at Transmitter 10) and Spectral Channel Equalization coefficients (at Receiver 9) as described (derived) for Type-I and Type-II systems in the section on "detailed description of the Invention" in this document, via any current or future Optical Delay Line or otherwise for achieving pre-emphasis and equalization equivalent to the method described in this document. Also any equivalent expression/factorization of these coefficients based on standard signal processing techniques either in time or frequency domain.

The practical aspects of application of Spectral Pre-emphasis coefficients at the Transmitter 10 and the other for Spectral Channel Equalization coefficients at Receiver 9 for both TYPE-I and TYPE-II (Practical Aspects of Pre-emphasis and Equalization in Type-I and Type-II systems as described in the section on "detailed description of the Invention" in this document). The basic idea being getting feasible coefficients which don't require non-causal operations and don't require the CSMx (AOM, etc.) to give any amplification (i.e. to apply gain<=1 at the CSMx)). Also the fact that amplification after the modulation may have to be toned down to ensure linearity in the channel, the rest of the gain being transferred to Receiver 9.

In a first embodiment, a type I pre-emphasis and equalization system is shown in FIG. 3.

In a second embodiment, a type II pre-emphasis and equalization system is shown in FIGS. 1 and 2.

Both embodiments may be applied to existing AM based TDM systems or a proposed RMF system which employs coherent detection. Both embodiments may be applicable to any pulsed communication system employing pulses having relative phase and amplitude properties in its spectral components as mentioned above.

The term Multi-Frequency is used as each pulse is treated independently of prior or subsequent pulses. The following description where frequencies are denoted by $\omega_1, \omega_2, \ldots \omega_n$ refer to any pulse and do not require continuous pulses. Thus the spectrum is read on a pulse-to-pulse basis and is commonly known as a theoretical Fourier transform of the pulse convolved with a frequency-domain sinc-function. This Fourier transform corresponds to a rectangular window representing time stretching done by the grating lens combination. $\omega_k$ refers to any resolved frequency on this spectrum and corresponds to the peak of the sinc-function coinciding with the first nulls of the same sinc-function with its peak positioned at similar resolved frequencies prior and subsequent to $\omega_k$.

$\omega_{kref}$ is used to name the resolved frequency (one of the $\omega_k$ described above) where the phase is used as reference with respect to which the phases of other resolved frequencies are read at the transmitter 10 and receiver 9. Note that $\omega_{kref}$ the reference frequency remains unchanged for the entire communication session once it has been mutually agreed upon between the transmitter 10 and the receiver 9 even though $\phi(\omega_{kref})$ the starting phase of $\omega_{kref}$ may change from pulse to pulse.

Phase expressions involving the subscript "$_{k\_kref}$" represent relative phases read with respect to the phase of $\omega_{kref}$. For Example $\phi(\omega_{k\_kref})=\phi(\omega_k)-\phi(\omega_{kref})$ represents the phase $\phi(\omega_k)$ of $\omega_k$ read relative to the phase $\phi(\omega_{kref})$ of $\omega_{kref}$.

"E" represents the expectation operator as used in statistical studies. For example, $E[\phi(\omega_k)-\phi(\omega_{kref})]=\phi(\omega_{k\_kref})_{avg}$.

Brief Outline of the Transmitter 10 Architecture for Type-II Pre-Emphasis/Equalization Illustrated in FIG. 2 is a block diagram of the basic transmitter 10 for a first embodiment of the present invention. A coherent pulsed source 11 generates pulses having an average constancy of relative phases between pulse frequency components. These pulses are sent to a spectral decomposer 12 which disperses and time stretches the pulses. Then, a CSMx 13 modulates an array of complex numbers, which may be baseband data, and/or pre-emphasis coefficients fed from a complex multiplier 15 at various resolved frequencies. The spectrally modulated signal is then split and sent on two parallel paths. One path is to an Inverse Fourier Transformer 16 that sends the signal to the channel 8. The other path is to a spectrum reader 14 that is capable of reading the amplitudes and relative phases with respect to the phase of a specified reference frequency of the spectrum. In an alternate embodiment, the splitting can also be done after the Inverse Fourier Transformer 16 and part of the signal may be sent to the channel 8 and the other to the spectrum reader 14.

Determination of RMF Type-II Pre-Emphasis/Equalization Coefficients

This is done through training pulses which are so far apart in time that even their propagation broadening in the dispersive medium does not lead to any significant overlap (i.e., 20*Log(|Signal|/|Overlap|)>>60-70 dB) (FIG. 5). This period can be determined for typical materials and lengths of corresponding media involved.

Initially, the training pulses are spectrally dispersed ($P(\omega_k)e^{j(\delta(\omega k))}$) from a grating-lens pair 4 after the pulsed laser source 3 and are modulated with training data $d(\omega_k)e^{j(\alpha(\omega k))}$, the data sequence being known to the receiver 9 as part of the handshake and signaling protocol.

In an exemplary embodiment, the training data sequence may be 1+j*0 at all frequencies. By having the same phase at all frequencies, the pulse is prevented from broadening. The pulse width maybe around 100 femtoseconds as the spectrum of such a pulse is broad enough to capture most of the fiber and amplifier bandwidth amplitude and phase parameters. Even though 1+j*0 is used for an exemplary embodiment of the present invention, any fixed complex number may be used and may simplify calculations. The training data may be modulated on $\omega_{kref}$ all through the signaling and datamode phases of the session.

Shown in FIG. 1, before the pulse is put on the channel, there is a 50% beam-splitting {10}, and the reflected pulse is sent to {1} for reading it's $A(\omega_k)$ and $\phi(\omega_{k\_kref})$, which is $\phi(\omega_k)$ with respect to $\phi(\omega_{kref})$ as mutually agreed between Transmitter 10 and receiver 9 during handshake. The transmitted pulse from the beam-splitter is reflected once from a mirror and sent on the channel {8}. After allowing for enough time for the pulses to reach receiver 9, the $A(\omega_k)$ and $\phi(\omega_{k\_kref})$ are transmitted to the receiver 9 by a 1-bit per pulse basic transmission scheme (or the existing 1 bit/subchannel links) using a predetermined precision and fixed point format. Once these $A(\omega_k)$ and $\phi(\omega_{k\_kref})$ have been transmitted for all frequencies. The next such training pulse is then transmitted. Communication of $A(\omega_k)$ and $\phi(\omega_{k\_kref})$ for each training pulse as just said above is not a necessity, as the $[\delta(\omega_{k\_kref})_{est}, P(\omega_k)_{est}]$ and $[\sigma_{\delta(\omega k\_kref)}, \sigma_P(\omega_k)]$ (optional) values sent during handshake along with $d(\omega_k)e^{j(\alpha(\omega k))}$ the known training sequence, will also do the job if the amplitude and phase jitters are not to high, but we intend to eliminate effects of amplitude and phase jitter of laser source from the pre-emphasis and equalizer coefficients estimation process, which will finally lead to a better signal to noise (commonly referred to as "SNR") ratio. Assuming no noise in the channel, what follows is a method to be followed to get modulation techniques, including PAM/QAM.

Analysis of what happens to the frequency $\omega_k$ in a pulse (arbitrary choice and this analysis will hold for all $\omega_k$'s in the pulse) as it passes through the channel 8 and to the receiver 9 follows. All phases will be mentioned with respect to the CW carrier phase except expressions including $\phi(\omega_{k\_kref})$. $\phi(\omega_{k\_kref})$ represents $\phi(\omega_{k\_kref})=\phi(\omega_k)-\phi(\omega_{kref})$. Further, point-wise complex frequency domain multiplications are valid as our training pulses do not overlap even after dispersion in the channel. Even in case of such overlap there would just have been some additive terms due to the linearity assumed, which is nearly zero due to no overlap.

Let $A(\omega_k)$ and $\phi(\omega_k)$ represent the amplitude and phase of the transmitted pulse. Thus signal at the input of the channel $S(\omega_k)_{ch\_in}$ is given by $S(\omega_k)_{ch\_in}=A(\omega_k)e^{j(\phi(\omega k))}=$
$P(\omega_k)e^{j(\delta(\omega k))}*d(\omega_k)d(\omega_k)e^{j(\alpha(\omega k))}$ Now at the channel output the signal $S(\omega_k)_{ch\_out}$ is given by $S(\omega_k)_{ch\_Out}=S(\omega_k)_{ch\_in}*C(\omega_k)e^{j(\beta(\omega k))}=$
$P(\omega_k)e^{j(\delta(\omega k))}*d(\omega_k)e^{j(\alpha(\omega k))}*C(\omega_k)e^{j(\beta(\omega k))}$ In contrast, the signal as read by the receiver 9 has a different phase as it reads the phases of different received frequencies with respect to $\phi(\omega_{kref})$ phase distorted through the channel, that is $e^{j(\delta(\omega kref))}*e^{j(\beta(\omega ke))}=e^{j(\phi\delta(\omega kref)+\beta(\omega kref))}$ if $(\omega_{k\_ref})$ is modulated with the fixed complex point 1+j*0, $\phi(\omega_{kref})=\delta(\omega_{kref})$.

$S(\omega_k)_{receiver\ 9\_read}=S(\omega_k)_{ch\_out}*e^{-j(\delta(\omega kref)+\beta(\omega kref))}$ or expressed in detail:

$S(\omega_k)_{receiver\ 9\_read}=P(\omega_k)e^{j(\delta(\omega k))}*d(\omega_k)e^{j(\alpha(\omega k))}*$
$C(\omega_k)e^{j(\beta(\omega k))}*e^{-j(\delta(\omega kref)+\beta(\omega kref))}$ At the receiver 9 we also know the amplitudes and relative phases with respect to $\delta(\omega_{kref})$ at the transmitter 10 sent by the 1-bit per pulse messages, these are $A(\omega_k)e^{j(\Phi(\omega k\_kref))}$ (only $A(\omega_k)$ and $\phi(\omega_{k\_kref})$ are actually sent. We reconstruct the complex expression at receiver 9.

So we now calculate $C(\omega_k)_{est} e^{j(\beta(\omega k)est)}$ at the receiver 9 for each $(\omega_k)$ for the no channel noise condition:

$$C(\omega_k)_{est} e^{j(\gamma(\omega k)est)} = S(\omega_k)_{receiver\ 9\_read} / A(\omega_k) e^{j(\phi(\omega k\_kref))}$$

$$C(\omega_k)_{est} e^{j(\gamma(\omega k)est)} = \frac{P(\omega_k) e^{j(\delta(\omega k))} * d(\omega_k) e^{j(\alpha(\omega k))} * C(\omega_k) e^{j(\beta(\omega k))} * e^{-j(\delta(\omega kref) + \beta(\omega kref))}}{A(\omega_k) e^{j(\phi(\omega k\_kref))}}$$

$$C(\omega_k)_{est} e^{j(\gamma(\omega k)est)} = \frac{P(\omega_k) e^{j(\delta(\omega k))} * d(\omega_k) e^{j(\alpha(\omega k))} * C(\omega_k) e^{j(\beta(\omega k))} * e^{-j(\delta(\omega kref) + \beta(\omega kref))}}{P(\omega_k) e^{j(\delta(\omega k))} * d(\omega_k) e^{j(\alpha(\omega k))} * e^{-j(\delta(\omega kref))}}$$

$$C(\omega_k)_{est} e^{j(\gamma(\omega k)est)} = C(\omega_k) e^{j(\beta(\omega k) - \beta(\omega kref))} = C(\omega_k)_{ideal} e^{j(\gamma(\omega k)ideal)}$$

Now it is important to note that the $C(\omega_k)_{est} e^{j(\gamma\beta(\omega k)est)}$ at the receiver 9 as shown calculated above is for just one training pulse and will be sufficient in the absolute ideal case. This operation is repeated N times in noisy conditions and the final estimate $C(\omega_k)_{EST} e^{j(\gamma(\omega k)EST)}$ for each $(\omega_k)$ has to be calculated by averaging over some N: training pulses. We will use only estimates at $(\omega_k)$ which are not close to zero after averaging:

$$C(\omega_k)_{EST} e^{j(\gamma(\omega k)EST)} = \frac{\sum_{(1,N)} C(\omega_k)_{est} e^{j(\gamma(\omega k)est)}}{N}$$

The N is again chosen (Predefined) such that we have a very high confidence (of say 99.95%) in the values of $C(\omega_k)_{EST} e^{j(\gamma(\omega k)EST)}$ at the worst possible SNRs that allow communication over the channel.

Demonstration of the Basic Principle Behind Working of Type-II Pre-Emphasis/Equalization (how Denser TDM Packing can be Achieved)

Lets put these $PR(\omega_k)_{EST}$ directly in the CSMx at its end and analyze what happens to the some pulse P': $P(\omega_k) e^{j(\lambda(\omega k))}$ with phases $\lambda(\omega_k)$ modulated with data $d(\omega_k) e^{j(\alpha(\omega k))}$ when it is ideally pre-emphasized in the transmitter 10 and then sent through the channel and finally read by the receiver 9. Also assume that we don't have noise on the channel and that the amplitude and phase jitters at all $(\omega_k)$ are also zero.

Let $B(\omega_k)$ and $\eta(\omega_k)$ represent the amplitude and phase of the transmitted pulse to which the ideal pre-emphasis has been applied. Thus, the signal at the input of the channel $S(\omega_k)_{ch\_in}$ is $$S(\omega_k)_{ch\_in} = B(\omega_k) e^{j(\eta(\omega k))} = P(\omega_k) e^{j(\lambda(\omega k))} * d(\omega_k) e^{j(\alpha(\omega k))} * PR(\omega_k)_{EST}$$

The signal at the channel output is $$S(\omega_k)_{Ch\_in} = P(\omega_k) e^{j(\lambda(\omega k))} * d(\omega_k) e^{j(\alpha(\omega k))} * PR(\omega_k)_{EST} * C(\omega_k) e^{j(\beta(\omega k))}$$

Assuming that estimation of $C(\omega_k)_{EST} e^{j(\gamma(\omega k)EST)}$ is perfect, then it follows:

$$PR(\omega_k)_{EST} = PR(\omega_k)_{ideal} = (C(\omega_k) e^{j(\beta(\omega k) - \beta(\omega kref))})^{-1} = (C(\omega_k))^{-1} * e^{j(\beta(\omega kref) - \beta(\omega k))}$$

$$S(\omega_k)_{ch\_out} = P(\omega_k) e^{j(\lambda(\omega k))} * d(\omega_k) e^{j(\alpha(\omega k))} * (C(\omega_k))^{-1} * e^{j(\beta(\omega kref) - \beta(\omega k))} * C(\omega_k) e^{j(\beta(\omega k))}$$

$$S(\omega_k)_{ch\_out} = P(\omega_k) e^{j(\lambda(\omega k))} * d(\omega_k) e^{j(\alpha(\omega k))} * e^{j(\beta(\omega kref))}$$

Note that we have exactly the data-modulated pulse we transmitted coming out of the channel, the extra $e^{j(\beta(\omega kref))}$ is due to the fact that the pre-emphasis coefficients were calculated from parameters read with respect to $(\omega_{kref})$ and that is not going to widen the pulse as it is a constant phase delay appearing for all frequencies. Thus such pre-emphasized data-modulated pulses can be packed more densely as they will automatically sharpen at the channel output point. This is the feature of Type-II systems that enables denser TDM packing density when pulses from many such systems are Time Division Multiplexed to achieve Terabits/sec bit rates. The pre-emphasized pulses may be overlapped in time at the channel input but the pre-emphasis is such that at the output they will separate out as long as linearity in the channel is maintained and the spacing between them is more than the width of the unpreemphasized data-modulated pulse. Why pre-emphasis done this way works is explained in the paragraph underlined in the subsection on practical aspects of Pre-emphasis/Equalization in Type-II Systems.

Practical Aspects of in Type-II Pre-Emphasis/Equalization: (How SNR Enhancement is Achieved)

In the previous analysis of the basis of functioning of a Type-II system we had done complex multiplication of the pre-emphasis coefficients with the signal spectrum without actually specifying any implementation aspects. We will provide the basic conceptual outline of practical pre-emphasis.

Suppose the pre-emphasis coefficients computed at receiver 9 were as follows:

$$PR(\omega_k)_{EST} = P(\omega_k) e^{j(\mu(\omega k))}$$

We assume that the CSMx (AOM etc.) cannot amplify any frequency, but can attenuate. In such a scenario we have two options for scaling down amplitude coefficients $P(\omega_k)$ we can have $P'(\omega_k) = P(\omega_k)/[\max(P(\omega_k))]$ i.e. we divide the amplitude coefficients at different frequencies by the Maximum Amplitude coefficient among all frequencies. The flat gain of $[\max(P(\omega_k))]$ can be applied after the signal has been pre-emphasized and modulated and is about to be sent on the channel.

The other option is to use $\text{Sqrt}[\text{Sum}(P(\omega_k)^2)]$ instead of $\max(P(\omega_k))$ in case even unity gain is also not possible to implement at the CSMx. Suppose g_max is the maximum possible gain available from the CSMx, then $P'(\omega_k) = P(\omega_k) * [g\_max/\max(P(\omega_k))]$ will also do. The corresponding flat gain $[g\_max/\max(P(\omega_k))]^{-1}$ may applied after the pre-emphasis and modulation by suitable splitting between transmitter 10 and receiver 9.

Similarly for the phases $\mu(\omega_k)$ of the pre-emphasis coefficients we have to find $\min(\mu(\omega_k))$ such that $[\mu(\omega_k) - \min(\mu(\omega_k))] >= 0$. This has to be done as giving -ve Phases would require advancing waves in time which being a non-causal operation is impossible. Thus we have to use $\mu'(\omega_k) = [\mu(\omega_k) - \min(\mu(\omega_k))]$ which effectively means that there will be a gross delay in the pulse but the group delay variation will be Pre-compensated so that as was shown the pulses regain their shape at the channel output.

So $P'(\omega_k) = P(\omega_k)/[\max(P(\omega_k))]$ or $P'(\omega_k)/[\text{Sqrt}[\text{Sum}(P(\omega_k)^2)]]$ and $\mu'(\omega_k) = [\mu(\omega_k) - \min(\mu(\omega_k))]$ have to be used instead of the original coefficients as communicated by the receiver. In realworld applications the pre-emphasis coefficients so obtained will be clubbed together (complex Multiplication) with the Complex data points at the corresponding frequencies and then sent to the CSMx.

The Flat gain part can be split between the transmitter 10 and receiver 9 with the transmitter 10 having the max possible part, which doesn't cause nonlinearity. This can be done by an amplifier and will lead to SNR enhancement at receiver 9 which will help higher spectral bit-loading for any conventional (or otherwise) modulation technique.

To successfully do direct frequency domain pre-emphasis in the optical domain, you may use the computed coefficients, because when a very short pulse traverses a grating followed by collimating lens (for example, the lens 4 of FIG. 1), the spectrally dispersed frequencies are many orders of magnitude spread out in time as well when compared to the time-span of the original ultrashort pulse and the channel impulse response. So applying amplitude corrections and phase delays by a CSMx ({5} of FIG. 1) actually is like delaying and amplifying those near infinitely long tones (on the timescale of the channel impulse response time-span) by the appropriate amounts to pre-compensate for the channel amplitude and phase distortions. Recombining them (Inverse Fourier transform:—IFT) at the lens followed by grating combination ({6} of FIG. 1) is creating the time-domain pre-compensated pulse that will appear at the channel output as if there was no group-delay distortion in the channel, but only a gross delay.

Brief Outline of the Transmitter 10 Architecture for Type-I Pre-Emphasis/Equalization The basic transmitter 10 architecture of Type-I Pre-emphasis/Equalization is illustrated in FIG. 3.

At the transmitter 10 pulses from a coherent pulsed source {21} (having the average constancy of relative phases between the "pulse frequency components" across pulses) are sent to a spectral decomposer {22} which disperses (also time stretches) them and the CSMx {23} modulates the array of Complex Numbers (which may be baseband data and/or pre-emphasis coefficients), fed from {25} at the various resolved frequencies. The spectrally modulated signal is then sent to the IFT (Inverse Fourier Transform) block {24} whose output is sent on the channel.

Determination of Type-I Pre-Emphasis/Equalization Coefficients

Here the jitter in amplitude and phase at the pulse source of transmitter 10 are treated as noise by the receiver 9 during the estimation of channel parameters and calculation of pre-emphasis coefficients. Thus the estimation error in channel characteristics is high unless the source jitter is of the order of channel noise.

This is done through training pulses which are so far apart in time that even their propagation broadening in the dispersive medium does not lead to any significant overlap (i.e., 20*Log(|Signal|/|Overlap|)>>60-70 dB) (FIG. 4). This period can be determined for typical materials and lengths of corresponding media involved.

Initially, the training pulses are the spectrally dispersed pulses $(P(\omega_k)e^{j(\delta(\omega k))})$ from a grating-lens pair after the laser source and are modulated with Training data $d(\omega_k)e^{j(\alpha(\omega k))}$, the data sequence being known to the receiver 9 as part of the handshake and signaling protocol. Note that the Training data sequence should be 1+j*0 at all frequencies (basically it should introduce the same phase at all frequencies so as not to broaden the pulse) in the Channel estimation phase we are in now, and the pulse width should be around 100 femto seconds as the spectrum of such a pulse is broad enough to capture most of the fiber and amplifier bandwidth amplitude and phase parameters. Also 1+j*0 (or any fixed complex number, 1+j*0 simplifies calculations)_should be modulated on $\omega_{kref}$ all through the signaling and datamode phases of the session.

For the moment assume that there is no noise in the channel and no source jitter. The general situation will be analyzed later for a Type-II system and the analysis for Type-I will follow on exactly the same lines. Right now we just show the method to be followed to get PAM/QAM etc demodulation going.

Analysis of what happens to the frequency $\omega_k$ in a pulse (arbitrary choice and this analysis will hold for all $\omega_k$'s in the pulse) as it passes through channel and receiver 9 processes it. All phases will be mentioned with respect to the CW carrier phase except expressions like $\phi(\omega_{k\_kref})$ Which represent: $\phi(\omega_{k\_kref})=\phi(\omega_k)-\phi(\omega_{kref})$. A point also to be noted is that all the Point wise complex frequency domain multiplications are valid as our training pulses do not overlap even after dispersion in the channel. Even in case of such overlap there would just have been some additive terms due to the linearity assumed, which are now zero due to no overlap.

Let $A(\omega_k)$ and $\phi(\omega_k)$ represent the amplitude and phase of the transmitted pulse. Thus signal at the input of the channel $S(\omega_k)_{ch\_in}$ is given by $$S(\omega_k)_{ch\_in} = A(\omega_k)e^{j(\phi(\omega k))} = P(\omega_k)e^{j(\delta(\omega k))} * d(\omega_k)e^{j(\alpha(\omega k))}$$

Now at the channel out put the signal $S(\omega_k)_{ch\_out}$ is given by $$S(\omega_k)_{ch\_out} = S(\omega_k)_{ch\_in} * C(\omega_k)e^{j(\beta(\omega k))} = P(\omega_k)e^{j(\delta(\omega k))} * d(\omega_k)e^{j(\alpha(\omega k))} * C(\omega_k)e^{j(\beta(\omega k))}$$

But the signal as read by the receiver 9 has a different phase as it reads the phases of different received frequencies with respect to $\phi(\omega_{kref})$ phase distorted through the channel i.e. $e^{j(\delta(\omega kref))} * e^{j(\beta(\omega kref))} = e^{j(\phi\delta(\omega kref) + \beta(\omega kref))}$. If $(\omega_{k\_ref})$ is modulated with the fixed complex point 1+j*0, $\phi(\omega_{kref})=\delta(\omega_{kref})$, but we make no such assumption. We assume that the amplitudes are faithfully read by and OSA (Optical spectrum Analyzer)

$$S(\omega_k)_{receiver\,9\_read} = S(\omega_k)_{ch\_out} * e^{-j(\delta(\omega kref)+\beta((\omega kref))}$$

or expressed in detail:

$$S(\omega_k)_{receiver\,9\_read} = P(\omega_k)e^{j(\delta(\omega k))} * d(\omega_k)e^{j(\alpha(\omega k))} * C(\omega_k)e^{j(\beta(\omega k))} * e^{-j(\delta(\omega kref)+\beta(\omega kref))}$$

At the receiver 9 we also know the amplitudes and relative phases with respect to $\delta(\omega_{kref})$ at the transmitter 10 sent by the 1-bit per pulse messages, these are $A(\omega_k)e^{j(\phi(\omega k\_kref))}$ (only $A(\omega_k)$ and $\phi(\omega_{k\_kref})$) are actually sent. We reconstruct the complex expression at receiver 9.

So we now calculate $C(\omega_k)_{est}e^{j(\beta(\omega k)est)}$ at the receiver 9 for each $(\omega_k)$ for the no channel noise and no jitter condition:

$$C(\omega_k)_{est}e^{j(\gamma(\omega k)est)} = \frac{P(\omega_k)e^{j(\delta(\omega k))} * d(\omega_k)e^{j(\alpha(\omega k))} * C(\omega_k)e^{j(\beta(\omega k))} * e^{-j(\delta(\omega kref)+\beta(\omega kref))}}{d(\omega_k)e^{j(\alpha(\omega k))}}$$

$$C(\omega_k)_{est}e^{j(\gamma(\omega k)est)} = P(\omega_k)C(\omega_k)e^{j[(\beta(\omega k)-\beta(\omega kref))+(\delta(\omega k)-\delta(\omega kref))]}$$

$$= C(\omega_k)_{ideal}e^{j(\gamma(\omega k)ideal)}$$

Now it is important to note that the $C(\omega_k)_{est}e^{j(\gamma\beta(\omega k)est)}$ at the receiver 9 as shown calculated above is for just one training pulse and will be sufficient in the absolute ideal case. This operation is repeated N times in noisy conditions and the final estimate $C(\omega_k)_{EST}e^{j(\gamma(\omega k)EST)}$ for each $(\omega_k)$ has to be calculated by averaging over some N: training pulses. We will use only estimates at $(\omega_k)$ which are not close to zero after averaging:

$$C(\omega_k)_{EST} e^{j(\gamma(\omega k)EST)} = \frac{\sum_{(1,N)} C(\omega_k)_{est} e^{j(\gamma(\omega k)est)}}{N}$$

The N is again chosen (Predefined) such that we have a very high confidence (of say 99.95%) in the values of $C(\omega_k)_{EST} e^{j(\gamma(\omega k)EST)}$ at the worst possible SNRs that allow communication over the channel.

After $C(\omega_k)_{EST} e^{j(\gamma(\omega k)EST)}$ have been estimated for all $(\omega_k)$, the receiver 9 will now compute the pre-emphasis coefficients $PR(\omega_k)$ for only those $(\omega_k)$ which don't have $C(\omega_k)_{EST}$ close to zero. Basically we are avoiding spectral nulls.

$$PR(\omega_k)_{EST} = (C(\omega_k)_{EST} e^{j(\gamma(\omega k)EST)})^{-1} = (C(\omega_k)_{EST})^{-1} * e^{-j(\gamma(\omega k)EST)}$$

$$PR(\omega_k)_{ideal} = P(\omega_k)^{-1} \_ C(\omega_k)^{-1} \_ e^{j\{(\beta(\omega kref) - \beta(\omega k)) + (\delta(\omega kref) - \delta(\omega k))\}}$$

How these pre-emphasis coefficients are used practically, we will see after the Type-II detailed analysis in the separate section on practical pre-emphasis and equalization. Actually we will see that these Pre-emphasis coefficients may have to be finally used as Equalization coefficients at the receiver end. The results of the following analysis will not change as linearity permits us to interchange linear blocks in the signal path without changing the overall transfer function.

Demonstration of the Basic Principle Behind Working of Type-I Pre-Emphasis/Equalization (How Denser TDM Packing Will Be Achieved)

Assuming that the transmitter 10 could put these $PR((\omega_k)_{EST}$ directly in the CSMx at its end, follows is an analysis of happens to the some pulse P': $P(\omega_k) e^{j(\lambda(\omega k))}$ with phases $\lambda(\omega_k)$ modulated with data $d(\omega_k) e^{j(\alpha(\omega k))}$ when it is ideally pre-emphasized in the transmitter 10 and then sent through the channel and finally read by the receiver 9. Also assuming that we don't have noise on the channel and that the amplitude and phase jitters at all $(\omega_k)$ are also zero.

Let $B(\omega_k)$ and $\eta(\omega_k)$ represent the amplitude and phase of the transmitted pulse to which the ideal pre-emphasis has been applied. Thus signal at the input of the channel $S(\omega_k)_{ch\_in}$ is given by $$S(\omega_k)_{ch\_in} = B(\omega_k) e^{(\eta(\omega k))} = P(\omega_k) e^{j(\lambda(\omega k))} * d(\omega_k) e^{j(\alpha(\omega k))} * PR(\omega_k)_{EST}$$

Now at the channel out put the signal $S(\omega_k)_{ch\_out}$ is given by $$S(\omega_k)_{ch\_out} = P(\omega_k) e^{j(\lambda(\omega k))} * d(\omega_k) e^{j(\alpha(\omega k))} * PR(\omega_k)_{EST} * C(\omega_k) e^{j(\beta(\omega k))}$$

Assume for the moment that estimation of $C(\omega_k)_{EST} e^{j(\gamma(\omega k)EST)}$ was perfect i.e. we can have:

$$PR(\omega_k)_{EST} = PR(\omega_k)_{ideal} = P(\omega_k)^{-1} \_ C(\omega_k)^{-1} \_ e^{j\{(\beta(\omega kref) - \beta(\omega k)) + (\delta(\omega kref) - \delta(\omega k))\}}$$

So $$S(\omega_k)_{ch\_out} = P(\omega_k) e^{j(\lambda(\omega k))} * d(\omega_k) e^{j(\alpha(\omega k))} * P(\omega_k)^{-1} \_ C(\omega_k)^{-1} \_ e^{j\{(\beta(\omega kref) - \beta(\omega k)) + (\delta(\omega kref) - \delta(\omega k))\}} * C(\omega_k) e^{j(\beta(\omega k))}$$

Adding and subtracting $\lambda(\omega_{kref})$ to the phase term of $P(\omega_k) e^{j(\lambda(\omega k))}$ we rewrite $$S(\omega_k)_{ch\_out} = e^{j(\lambda(\omega k) - \lambda(\omega kref) + \lambda(\omega kref))} * d(\omega_k) e^{j(\alpha(\omega k))} * e^{j\{(\beta(\omega kref) - \delta(\omega k))\}}$$

using the fact that under no jitter conditions the relative phases at the source are exactly maintained i.e. $(\lambda(\omega_k) - \lambda(\omega_{kref})) = (\delta(\omega_k) - \delta(\omega_{kref}))$ we get:

$$S(\omega_k)_{ch\_out} = d(\omega_k) e^{j(\alpha(\omega k))} * e^{j(\lambda(\omega kref) + \beta(\omega kref))}$$

Note that although the datapoint $d(\omega_k) e^{j(\alpha(\omega k))}$ will be recovered after reading with respect to $(\omega_{kref})$, The shape of the pulse is not what left the transmitter 10. It is the baseband signal with the channel distorted phase of $(\omega_{kref})$ added to all frequencies. This is another vital difference from Type-II systems, which under ideal conditions would exactly reproduce the data-modulated pulse which entered at the channel (refer Type-II analysis). Thus any source level pulse-shaping at the envelope level (e.g. gaussian) will be annulled at the channel output as the raw base band signal appears here. Thus we will have to shape our baseband data spectrum so that we can have denser TDM.

In case we go in for equalization (at the receiver 9) instead of pre-emphasis (at transmitter 10) the channel output will be distorted and the pulses broadened as in the current systems but the equalization at the receiver will ensure that QAM etc can still be demodulated/decoded relatively to $\omega_{kref}$ if linearity was there. The Coefficients for Equalization will be the same as Pre-emphasis coefficients computed above under conditions of linearity (which has been assumed at this point) as interchanging linear blocks in the signal path doesn't alter the overall Transfer function of a linear system.

Practical Aspects of in Type-I Pre-Emphasis/Equalization (How SNR Enhancement is Achieved)

Here too the same thing has to be done to the raw Pre-emphasis coefficients as was done above for Type-II systems, i.e.: $P'(\omega_k) = P(\omega_k)/[\max(P(\omega_k))]$ or $P'(\omega_k) = P(\omega_k)/[Sqrt[Sum(P(\omega_k)^2)]]$ or $P'(\omega_k) = P(\omega k) * [g\_max/\max(P(\omega_k))]$ and $\mu'(\omega_k) = [\mu(\omega_k) - \min(\mu(\omega k))]$ have to be used instead of the original coefficients as q ? communicated by the receiver. The method of clubbing the pre-emphasis coefficients and the data-symbols before application to the CSMx holds here also as the does the Flat gain application part on the same lines as the previous section on Practical aspects of Pre-emphasis/Equalization in Type-II systems.

Thus the Flat gain part can again be split between the transmitter 10 and receiver 9 with the transmitter 10 having the max possible part, which doesn't cause nonlinearity. This can be done by an amplifier and will lead to SNR enhancement at receiver 9 which will help higher spectral bit-loading for any conventional (or otherwise) modulation technique.

The other option is to apply the phases and the normalized amplitudes obtained as above at the receiver 9 and distribute the flat gain between transmitter 10 and receiver 9.

Properties and Apparatus of Optical Communication Systems on Which RMF is Based

1. The relative phase relations between the frequencies $\omega_k$ of a optical pulse to an arbitrary frequency $\omega_{kref}$ of the pulse, from the laser is typically represented by a mean $\delta(\omega_{k\_kref})_{avg}$ and variance $\sigma_{\delta(\omega k\_kref)}$ when their values are considered across pulses, and that they follow a distribution $D_\phi$. Taking Expectation across pulses we can write:

$$E[\delta(\omega_k) - \delta(\omega_{kref})] = \delta(\omega_{k\_kref})_{avg}$$

$$E[\{(\delta(\omega_k) - \delta(\omega_{kref})) - \delta(\omega_{k\_kref})_{avg}\}^2] = \sigma_{\delta(\omega k\_kref)}$$

This property is inherent in coherent pulsed lasers and the lower the $\sigma_{\phi(\omega k\_kref)}$, the more suited is the system for employment of coherent modulation/demodulation techniques (e.g. QAM/Mary PSK etc.) as we get high SNR (Signal to Noise Ratio) at the receiver 9.

2. The amplitudes $P(\omega_k)$ of '$\omega_k$' s of the pulse also are typically characterized by a mean $P(\omega_k)_{avg}$ and variance $\sigma_P(\omega_k)$ and a distribution $D_A$, i.e.

$$E[P(\omega_k)]=P(\omega_k)_{avg}$$

$$E[(P(\omega_k)-P(\omega_k)_{avg})^2]=\sigma_P(\omega_k)$$

This again is an inherent property in coherent pulsed lasers and the lower the $\sigma_P(\omega_k)$ the more suited the system for employment in communication systems as this ensures high SNR at the receiver 9 when incoherent techniques or coherent techniques using amplitude (e.g. QAM) can be employed.

3. The receiver (receiver 9) is capable of reading optical spectra at their respective ends for both amplitude $A(\omega_k)$ and relative phase $\phi(\omega_{k\_kref})$ for different frequencies. The Amplitudes are read by standard equipment like OSA (Optical Spectrum Analyzer) and the Phases with respect to the phase $\omega_{k\_kref}$ by some standard interferometric technique like STRUT (Spectrally and Temporally Resolved Up conversion Technique) These are just examples of methods, the crux is to be able to read amplitude $A(\omega_k)$ and phase $\phi(\omega_{k\_kref})$ for different frequencies. Reading of Amplitudes and relative phases at the transmitter 10 (in a similar fashion as described for receiver 9 above) is required by Type-II RMF systems only.

4. Another important requirement is that the resolved spectral frequencies of the pulses can be directly modulated in the frequency-domain by complex symbols (a+j*b) using a Complex Spectral Modulator (henceforth referred to as CSMx). CSMx is a generalized term for AOM (Acousto Optic Modulator) etc used in current Coherent Pulsed Optical Communication Systems.

5. The nonstationarity in $D_\phi$ and $D_A$ is on a timescale much larger than that of the pulse period, TDM timeframes etc. Same assumptions are made on the nonstationarity of the channel also. This is a requirement on most communication systems, optical or otherwise. When preparing mathematical models the nonstationarity is always assumed to be slower than the adaptation algorithms employed.

6. For calculating "bits per resolved frequency" figures, we assume $D_\phi$ and $D_A$ to be AWGN in their respective domains (i.e., Amplitude and Phase). However, this is not a constraint as similar figures from other distributions failing which such distributions can be approximated by a Gaussian, corresponding to a conservative scenario.

7. Noise on the channel is zero mean and can be characterized by a variance $\sigma$. White noise and Gaussian profile are assumed but for the same reasons as in (6) above these are not limitations. If the noise is not zero mean, the analysis done in this document will still apply after the noise-mean has been estimated and subtracted from the received signal.

Linearity in the communication channel (Optical fiber) is assumed though maintaining it in the channel is an issue in the currently proposed and existent systems.

Brief Outline of the Objective and Architecture of Type-II RMF Systems

Besides achieving coherent modulation/demodulation and loading more than one bit per subchannel, the aim in such systems is to get exactly the shape of the pulse modulated with data (as at the transmitter 10) at the channel output (as if there was no channel in between transmitter 10 and receiver 9) by using suitable pre-emphasis coefficients at the transmitter 10. Doing this enables much denser packing of pulses from various Type-II systems when they are used as parts of a TDM based high-speed communication system. The pre-emphasis coefficients are learnt by the receiver 9 and communicated to the transmitter 10 during the Training phase.

Note that the data points at the transmitter 10 in case of RMF systems can be in general complex i.e. QAM or M-ary PSK etc while the currently proposed AM based systems employ strictly real numbers as data points in the transmitter 10 shown in FIG. 2.

The basic architecture of Type-II RMF receiver 9 is illustrated in FIG. 2.

At the receiver 9 the received pulses are sent to a spectral decomposer {17}, which outputs dispersed frequencies {also time stretched}. This can be followed by an Equalizer in the spectral domain (that would require a CSMx and/or amplifier at the receiver 9 too), which we have shown by the dotted line. However to avoid extra hardware we have shown a spectrum reader {18} similar to the one described for the transmitter 10 {14}. The measurements from {18} are then sent for Equalization {19} in the electrical domain. The Equalized frequency components are sent for symbol to bit mapping at the data-decoder {20}

Demonstration of the Basic Principle Behind Working of Type-II RMF Systems (read in continuation with the section on demonstration of the working principle of Type-II pre-emphasis/Equalization)

But the signal as read by the receiver 9 has a different phase as it reads the phases of different received frequencies with respect to $\eta(\omega_{kref})$ phase distorted through the channel i.e. $e^{j(\eta(\omega kref))}*e^{j(\beta(\omega kref))}=e^{j(\eta(\omega kref)+\beta(\omega ref))}$. Note that $\eta(\omega_{kref})=\lambda(\omega_k)$ as no data is put on it i.e. it is always modulated with 1+j*0. (or some predetermined complex point, essentially it can carry no information, the choice of 1+j*0 only simplifies calculation) Thus:

$$S(\omega_k)_{receiver\ 9\_read}=S(\omega_k)_{ch\_out}*e^{-j(\lambda(\omega kref)+\beta(\omega kref))}$$

or expressed in detail:

$$S(\omega_k)_{receiver\ 9\_read}=P(\omega_k)e^{j(\lambda(\omega k))}*d(\omega_k)e^{j(\alpha(\omega k))}*$$
$$(C(\omega_k))^{-1}*e^{j(\beta(\omega kref)-\beta(\omega k))}*C(\omega_k)e^{j(\beta(\omega k))}*$$
$$e^{-j(\lambda(\omega kref)+\beta(\omega kref))}$$

Now this simplifies to $$S(\omega_k)_{receiver\ 9\_read}=P(\omega_k)e^{j(\lambda(\omega k))}*d(\omega_k)e^{j(\alpha(\omega k))}*$$
$$e^{-j(\lambda(\omega kref))}$$

Continuing by rearranging the RHS of the last equation we can write:

$$S(\omega_k)_{receiver\ 9\_read}=P(\omega_k)*d(\omega_k)e^{j(\alpha(\omega k))}*$$
$$e^{j(\lambda(\omega k)-\lambda(\omega kref))}$$

Further we multiply $S(\omega_k)_{receiver\ 9\_read}$ by $e^{-\phi(\omega k\_kref)avg}$ and $1/A(\omega_k)_{avg}$, which the transmitter 10 communicated to the receiver 9 during the handshake session. Thus:

$$(d(\omega_k)e^{j(\alpha(\omega k))})_{EST}=(P(\omega_k)/A(\omega_k)_{avg})*$$
$$d(\omega_k)e^{j(\alpha(\omega k))}*e^{j(\lambda(\omega k)-\lambda(\omega kref))-\phi(\omega k\_kref)avg)}$$

For the ideal case of no phase and amplitude jitters at all $(\omega_k)$ in the laser source:

$$(d(\omega_k)e^{j(\alpha(\omega k))})_{EST}=d(\omega_k)e^{j(\alpha(\omega k))}$$

Thus we recover the data point at the receiver 9 under ideal conditions and have demonstrated the basic principle of the working of Type-II systems.

Brief Outline of the Objective and Architecture of Type-I RMF Systems

Besides achieving coherent modulation/demodulation and loading more than one bit per subchannel, the aim in such systems is to either get signal with exactly the baseband data spectrum at the channel output (if pure pre-emphasis at transmitter 10 is used), or the baseband data spectrum at the Equalizer output at the receiver 9 (if pure Electrical domain Equalization at receiver 9 is used and in this case there will be no improvement in TDM packing density). By using suitable combination of pre-emphasis (transmitter 10) and Equalization (at receiver 9) coefficients we can achieve denser packing of pulses from various Type-I systems when they are used as parts of a TDM based high-speed communication system. The pre-emphasis coefficients are learnt by the receiver 9 and communicated to the transmitter 10 during the Training phase.

Note that the data points at the transmitter 10 in case of RMF systems can be in general complex i.e. QAM or M-ar PSK etc. while the currently proposed AM based systems employ strictly real numbers as data points in the transmitter 10 shown in FIG. 3.

The basic architecture of Type-I RMF receiver 9 is illustrated in FIG. 3

At the receiver 9 the received pulses are sent to a spectral decomposer {26}, which outputs dispersed frequencies (also time stretched}. This can be followed by an Equalizer in the spectral domain (which would require a CSMx and/or amplifier at the receiver 9 too), which we have shown by the dotted line. However to avoid extra hardware we have shown a spectrum reader {27} similar to the one described for the Type-II transmitter 10 in FIG. 2 {14}. The measurements from {27} are then sent for Equalization {28} in the electrical domain. The Equalized frequency components are sent for symbol to bit mapping at the data-decoder {29}

Demonstration of the Basic Principle Behind Working of Type-I RMF Systems (read in continuation with the section on demonstration of the working principle of Type-I pre-emphasis/Equalization)

The signal as read by the receiver 9 has a different phase as it reads the phases of different received frequencies with respect to $\eta(\omega_{kref})$ phase distorted through the channel i.e. $e^{j(\eta(\omega kref))} * e^{j(\beta(\omega kref))} = e^{j(\eta(\omega kref) + \beta(\omega kref))}$. Note that $\eta(\omega_{kref}) = \lambda(\omega_k)$ as no data is put on it i.e. it is always modulated with $1+j*0$. (or some predetermined complex point, essentially it can carry no information, the choice of $1+j*0$ only simplifies calculation)Thus:

$$S(\omega_k)_{receiver\ 9\_read} = S(\omega_k)_{ch\_out} * e^{-j(\lambda(\omega kref) + \beta(\omega kref))}$$

which is the data point we wanted:

$$S(\omega_k)_{receiver\ 9\_read} = d(\omega_k) e^{j(\alpha(\omega k))} * e^{j(\lambda(\omega kref) + \beta(\omega kref))} * e^{-j(\lambda(\omega kref) + \beta(\omega kref))} = d(\omega_k) e^{j(\alpha(\omega k))}$$

Thus we see that Type-I systems are a simple algorithm level upgradation from the existing architectures without any extra hardware required as reading spectral parameters is not required at the transmitter 10 and also communication of the same to the receiver 9 is also not required. Integrating type-I systems in a larger TDM based Terabit network where many such systems operate in tandem is also easily achieved, but the enhancement in TDM packing density will be sub optimal in comparison to Type-II systems if pure Pre-emphasis is used. In case pure Equalization is used there will be no improvement in TDM packing density. An Optimal combination of Pre-emphasis and equalization for achieving more control on the shape of the pulse at the channel output in Type-I systems provides scope for further work. The estimation errors in channel parameters (and thus pre-emphasis/ Equalization coefficients) in case of high amplitude and phase jitters at the source of the coherent pulses may cause some concern, as in such conditions Type-II systems with Training sequence having the optional 1-bit per pulse link as illustrated in FIG.(5) will perform better.

SNR Estimation, Choice of Modulation Scheme and Bit Allocation

Following the completion of the pre-emphasis/equalization coefficient computation, and the subsequent communication of the same from the receiver 9 to the transmitter 10 by the primitive link, they will be applied by the transmitter 10 and receiver 9 on the lines described above in the sections on practical aspects of pre-emphasis/equalization. The ensuing training pulses to be used for SNR estimation will be pre-emphasized/Equalized/Both as per the requirements of Type-I and Type-II as the case may be. These training pulses will also have actual data points (Pseudo random Sequence) modulated at different frequencies of the pulse, in contrast to the 100 femto second pulses with $1+j*0$ on all frequencies used up till now.

The receiver 9 will have prior knowledge (according to protocol) of the data-points modulated On these training pulses and will demodulate the incoming signal using the algorithms presented in the sections on Type-I and Type-II systems. The demodulated point will be compared with the known reference points and estimates of variance of amplitude noise $\sigma_{noise\_amp}(\omega_k)$ and phase noise $\sigma_{noise\_ph}(\omega_k)$ at different frequencies will be made at the receiver 9. Which will be used to compute following SNRs (these SNRs are pessimistic estimates which use envelopes of white noise around the actual colored noise profile)

$$SNR(\omega k)QAM = 10*\log 10[R(\omega k)2/(\sigma noise\_amp(\omega k) + R(\omega k)2*\sigma noise\_ph(\omega k))]$$

$$SNR(\omega k)PAM = 10*\log 10[R(\omega k)2/(\sigma noise\_amp(\omega k))]$$

$$SNR(\omega k)M\_PSK = 10*\log 10[R(\omega k)2/(R(\omega k) 2*\sigma noise\_ph(\omega k))]$$

Where $R(\omega_k)$ is the rms of the constellation (QAM/PAM/M-ary-PSK) used at $\omega_k$. Note that the logarithmic SNRs are only for illustration and their linear counterparts may also be used to reduce on computational complexity in the system.

Once the SNRs have been computed at different frequencies for different modulation Schemes, bit allocation using the corresponding waterfall curves is done for each frequency and modulation scheme. This is followed by the computing the total bit allocation for all $\omega_k$ in the pulse under different modulation schemes (QAM/PAM/M-ary-PSK). The Modulation scheme, which gives the maximum bitloading per pulse, will be chosen and communicated to the transmitter 10 along with the number bits to be loaded on each frequency using the primitive link as discussed before. Refer FIG. 6 for an illustration of the choice of modulation scheme made above. Once this has been done the transmitter 10 and receiver 9 will proceed to the data-mode.

In case the amplitude and the phase jitter characteristics of the source at transmitter 10 are already known, PAM is chosen if Phase jitter dominates, Mary-PSK is chosen if Amplitude jitter dominates and QAM if both have the same sweep in the constellation plane.

Data-Mode:

Using the Modulation scheme selected on the lines discussed in the previous section and the bitloading profile communicated by the receiver 9 the transmitter 10 starts pumping data in pulses, which are periodically punctuated by training pulses (with $1+j*0$ modulated on all frequencies to track slow drift in relative phases of "pulse frequency components"

across pulses and slow channel nonstationarity). The receiver 9 is aware of the instants at which these will occur, and uses them to correct for slow nonstationarity in the channel using the techniques for computing Pre-emphasis/Equalization Coefficients.

Demodulation of PAM is just reading the Amplitudes at the receiver 9 during datamode, although the handshake and training and handling of training pulses will remain same as described in the preceding sections. For Mary PSK the demodulation during datamode proceeds on the same lines as QAM demodulation as discussed in detail in the previous sections.

Handshake and Signaling:

The handshake procedure of any modem aims at detecting the presence of the remote transmitter 10/receiver 9 as the case may be followed by exchange of basic and important parameters, which establish compatibility or confirm incompatibility. If compatibility is established, then the next step of handshake is to exchange parameters, establish synchronization which will be vital for proceeding on with the training phase where important parameters like pre-emphasis coefficients, equalization coefficients and clock tracking can be done.

There will be two types of systems Type-I (Ref FIG.-2) and Type-II. (Ref FIG.-1 and FIG. 3). Though a bidirectional optical link (i.e. both local and remote modems having both transmitter 10 and receiver 9) is not a necessity, it is preferable, as otherwise in a unidirectional link the receiver 9

Will have to communicate some parameters during handshake and signaling through Some alternate link like an RF link etc. We proceed to illustrate the basic concepts of handshake and signaling assuming a bidirectional optical link.

Start of Handshake for Both Type-I and Type-II Systems Have Following Steps:

RMF TYPE-I is a simpler system (Ref FIG. 3) in which it either doesn't have the facility of the transmitter 10 reading the Amplitude and phase of its own pulses, or even if it does have the facility, it doesn't choose to do so. Thus it doesn't shape its pulse to a good smooth gaussian (or any other preferred) shape, and also doesn't read its pulse statistics like Amplitude and phase spectrum and jitter. Like said earlier either it doesn't have the capability or the pulsed laser source is so good in terms of smoothness of spectrum and jitter characteristics, that A Type-II system (Refer FIGS. 1 and 3) could still decide to carry on as a Type-I system.

Detection of pulses of predefined frequencies according to protocol, which confirm the presence of a remote modem and its intent to establish a communication link.

This is followed by setting up a 1-bit per pulse communication link as in the most primitive optical communication systems that are commercially available. Alternatively if any of the existing optical pulse shaping based schemes which modulate 1-bit (subchannel of the pulse) is trying to upgrade to our paradigm, then they can use their existing link. Using this link the first thing, which is decided between modems, is whether to follow Type-I or Type-II negotiation. If either party demands a type-I negotiation the remote receiver 9 will have to agree.

Then we have the transmitter sending some (predefined number according to protocol) unmodulated pulses (of approximately 100 femto seconds, as their spectrum spans the available bandwidth of most fibers and other network elements like amplifiers) from its laser source so as to get a feedback from the receiver about the less attenuated frequencies so that the $\omega_{kref}$, a less attenuated frequency can be mutually agreed upon between the transmitter and receiver whose phase will be henceforth used as reference to measure the phases of all other frequencies.

Following which the receiver 9 reads the Amplitude spectrum of the received pulse and communicates $\omega_{kref}$ back to the transmitter by the primitive 1-bit/pulse communication link or the existing 1-bit/per subchannel links as mentioned above. $\omega_{kref}$ will in future be used for reading the phase of other $\omega_k$ in their respective pulses at the transmitter 10 and receiver 9. The $\omega_{kref}$ having 1+j*0 preferably modulated for the rest of the session for ease of calculation, although any fixed predetermined complex point will do).

Further Handshake and Signaling if Type-I was Negotiated Will Consist of the Following Basic Steps:

Finally the transmitter 10 sends a predecided bit pattern according to protocol, using the primitive 1-bit/pulse primitive link or the 1-bit/(subchannel of pulse) link if such a pulse shaping based system is trying to upgrade to our paradigm. The end of such a sequence, detected at the receiver 9 expects it to be ready for the next phase of signaling which is the training session.

During the training session the pre-emphasis/Equalization coefficients are determined at the receiver and conveyed to the transmitter 10 using the link established for such communication during the signaling phase, as per the descriptions in previous sub-sections on Type-I systems.

Following this is the application of the pre-emphasis (at transmitter 10)/Equalization (at receiver 9) coefficients as per the details of Type-I systems analysis and practical pre-emphasis.

Then SNR Estimation and choice of modulation scheme for data mode as per the details in the relevant sub-section and illustrations in FIG. 6, is done at the receiver 9 and conveyed to transmitter 10 using the link established for such communication during the signaling phase for proceeding to datamode.

Further Handshake and Signaling if Type-II was Negotiated will Consist of the Following Basic Steps:

The optical modem intent upon establishing a Type II communication link reads its own spectrum and if there are irregularities from the smooth Gaussian shape (any other preferred) it will use these numbers as feedback to its optical CSMx (Complex Spectral Modulator) to iteratively home in on a fixed modulation pattern so that the pulse as seen after the modulator, is as desired. Hence forth for the rest of the handshake, training and data transfer mode such smoothed pulses will be considered unmodulated as this was a source level correction.

Next we have the transmitter 10 reading the relative phases $\delta(\omega_{k\_kref}) = \delta(\omega_k) - \delta(\omega_{kref})$ and amplitudes $P(\omega_k)$ at different frequencies ($\omega_k$) of the pulse over a plurality of pulses. The number of such pulses will be determined by and the confidence (say 99.95%) with which we want these estimated values $\delta(\omega_{k\_kref})_{est}$, $\sigma_{\delta(\omega k\_kref)}$, $P(\omega_k)_{est}$ and $\sigma_P(\omega_k)$ to be true, and the statistics as mentioned in the assumptions section, i.e.:

$$E[\delta(\omega_k) - \delta(\omega_{kref})] = \delta(\omega_{k\_kref})_{avg}$$

$$E[\{(\delta(\omega_k) - \delta(\omega_{kref})) - \delta(\omega_{k\_kref})_{avg}\}^2] = \sigma_{\delta(\omega k\_kref)}$$

And $$E[P(\omega_k)] = P(\omega_k)_{avg}$$

$$E[(P(\omega_k) - P(\omega_k)_{avg})^2] = \sigma_A(\omega_k)$$

Having done so, the transmitter 10 then communicates these $[\delta(\omega_{k\_kref})_{est}, P(\omega_k)_{est}]$ and $[\sigma_{67\ (\omega k\_kref)}, \sigma_P(\omega_k)]$ (optional) in a precision and fixed point format, predefined according to protocol, using the primitive 1-bit/pulse primitive link or the 1-bit/(subchannel of pulse) link if such a pulse shaping based system is trying to upgrade to our paradigm.

Finally the transmitter 10 sends a predefined bit pattern according to protocol, using the primitive 1-bit/pulse primitive link or the 1-bit/(subchannel of pulse) link if such a pulse shaping based system is trying to upgrade to our paradigm. The end of such a sequence, detected at the receiver 9 expects it to be ready for the next phase of signaling which is the training session.

During the training session the pre-emphasis/Equalization coefficients are determined at the receiver and conveyed to the transmitter 10 using the link established for such communication during the signaling phase, as per the descriptions in previous sub-sections on Type-II systems.

Following this is the application of the pre-emphasis coefficients (at transmitter 10) and flat gain at receiver 9 as per the details of Type-II systems analysis and practical pre-emphasis.

As mentioned previously, the SNR Estimation and choice of modulation scheme for data mode as illustrated in FIG. 6 is done at the receiver 9 and conveyed to transmitter 10 using the link established for such communication during the signaling phase proceeding datamode.

Type II System in Nonideal Conditions

This is to be read in continuation with the end of the section presenting the basic algorithm for Type-II systems.

We had made assumptions about TYPE-II System's pre-emphasis coefficients being ideal due to no noise on channel and other special no source-jitter idealizations for this particular calculation, just to demonstrate the proof of concept that QAM can be used even when carrier phase is random from symbol to symbol as long as the inter carrier phase relations are roughly same across symbols (read pulse to pulse for optical scenario).

Henceforth we put in the non idealities in a Type-II system (amplitude and phase jitters assuming these to be much greater than channel noise).

Lets analyze the estimate $C(\omega_k)_{est} e^{j(\gamma(\omega k)est)}$ in noisy channel conditions, i.e.

$$S(\omega_k)_{ch\_out} = S(\omega_k)_{ch\_in} * C(\omega_k) e^{j(\beta(\omega k))} = P(\omega_k) e^{j(\delta(\omega k))} * d(\omega_k) e^{j(\alpha(\omega k))} * C(\omega_k) e^{j(\beta(\omega k))} + n(\omega_k) e^{j(\mu(\omega k))}$$

where $n(\omega_k) e^{j(\mu(\omega k))}$ represents the channel noise.

So $$S(\omega_k)_{receiver\ 9\_read} = (P(\omega_k) e^{j(\delta(\omega k))} * d(\omega_k) e^{j(\alpha(\omega k))} * C(\omega_k) e^{j(\beta(\omega k))} + n(\omega_k) e^{j(\mu(\omega k))}) * e^{-j(\delta(\omega kref) + \beta(\omega kref))}$$

thus $$C(\omega_k)_{est} e^{j(\gamma(\omega k)est)} = C(\omega_k) e^{j(\beta(\omega k) - \beta(\omega kref))} + (n(\omega_k) e^{j(\mu(\omega k))} / (P(\omega_k) e^{j(\delta(\omega k))} * d(\omega_k) e^{j(\alpha(\omega k))} * e^{-j(\delta(\omega kref))}))$$

After taking the RHS denominator term as a product term in the LHS numerator, multiplying by complex conjugates on both sides and finally taking expectations:

$$E[(C(\omega_k)_{est})^2] = E[(C(\omega_k))^2] + (\sigma_{noise}/(R(\omega_k) * P(\omega_k)_{avg})^2)$$

Where $R(\omega_k)$ is the RMS of the constellation (QAM/PAM/M-ary-PSK) and $P(\omega_k)_{avg}$ is the average value of the Pulse amplitude at $(\omega_k)$. Taking the $1^{st}$ order term in the binomial expansion:

$$[C(\omega_k)_{est-C(\omega k)}]_{rms} \sim (1/(2*C(\omega_k)))*(\sigma_{noise}/(R(\omega_k)*P(\omega_k)_{est})^2)$$

Thus we can see that the estimation error will be high even for a very low noise at a Spectral null ($C(\omega_k)$ very small). Thus we will use only estimates at $(\omega_k)$ which are not close to zero after averaging:

$$C(\omega_k)_{EST} e^{j(\gamma(\omega k)EST)} = \frac{\sum_{(1,N)} C(\omega_k)_{est} e^{j(\gamma(\omega k)est)}}{N}$$

The N is again chosen (Predefined) such that we have a very high confidence (of say 99.95%) in the values of $C(\omega_k)_{EST} e^{j(\gamma(\omega k)EST)}$ at the worst possible SNRs that allow communication over the channel. The noise here is just the channel noise as we have Taken care of source jitter in phase in amplitude by transmitting $A(\omega_k) e^{j(\phi(\omega k\_kref))}$ to the receiver 9.

After $C(\omega_k)_{EST} e^{j(\gamma(\omega k)EST)}$ have been estimated for all $(\omega_k)$, the receiver 9 will now compute the pre-emphasis coefficients $PR(\omega_k)$ for only those $(\omega_k)$ which don't have $C(\omega_k)_{EST}$ close to zero. Basically we are avoiding spectral nulls.

$$PR(\omega_k)_{EST} = (C(\omega_k)_{EST} e^{j(\gamma(\omega k)EST)})^{-1} = (C(\omega_k)_{EST})^{-1} * e^{-j(\gamma(\omega k)EST)}$$

Assume the $C(\omega_k)_{EST} e^{j(\gamma(\omega k)EST)}$ to be represented by:

$$C(\omega_k)_{EST} e^{j(\gamma(\omega k)EST)} := (C(\omega_k) + \Delta C(\omega_k)) e^{j(\gamma(\omega k) + \Delta\gamma(\omega k))}$$

i.e. there is an error in estimation of $\Delta C(\omega k)$ in amplitude and $\Delta\gamma(\omega k)$ in phase Now ideally $$PR(\omega_k)_{ideal} = (C(\omega_k) e^{j(\gamma(\omega k))})^{-1} = (C(\omega_k))^{-1} * e^{j(\beta(\omega kref) - \beta(\omega k))}$$

Taking total differential $$dPR(\omega_k)_{ideal} = -(C(\omega_k))^{-2} * e^{-j(\gamma(\omega k))} dC(\omega_k) - j*(C(\omega_k))^{-1} e^{-j(\gamma(\omega k))} d\gamma(\omega_k)$$

applying the differential relation to small quantities:

$$\Delta PR(\omega_k)_{ideal} = -(C(\omega_k))^{-2} * e^{-j(\gamma(\omega k))} \Delta C(\omega_k) - j*(C(\omega_k))^{-1} e^{-j(\gamma(\omega k))} \Delta\gamma(\omega_k)$$

$$\Delta PR(\omega_k)_{ideal} = -(C(\omega_k))^{-1} * e^{-j(\gamma(\omega k))} (C(\omega_k))^{-1} \Delta C(\omega_k) - j*\Delta\gamma(\omega_k))$$

Now $$PR(\omega_k)_{EST} = PR(\omega_k)_{ideal} + \Delta PR(\omega_k)_{ideal}$$

Therefore $$PR(\omega_k)_{EST} = (C(\omega_k))^{-1} * e^{-j(\gamma(\omega k))} (1 - C(\omega_k)^{-1} \Delta C(\omega_k) + j*\Delta\gamma(\omega_k))$$

The practical aspects of what pre-emphasis coefficients are sent to transmitter 10 and what is kept at receiver 9 for equalization will be discussed later.

Lets analyze what happens to the some pulse $P^t$: $P(\omega_k) e^{j(\lambda(\omega k))}$ and jitter in both amplitude and phase, modulated with data $d(\omega_k) e^{j(\alpha(\omega k))}$ when it is pre-emphasized in the transmitter 10 and then sent through the channel and finally read by the receiver 9. Let $B(\omega_k)$ and $\eta(\omega_k)$ represent the amplitude and phase of the transmitted pulse to which the nonideal pre-emphasis $PR(\omega_k)_{EST}$ has been applied. Thus signal at the input of the channel $S(\omega_k)_{ch\_in}$ is $$S(\omega_k)_{ch\_in} = B(\omega_k) e^{j(\eta(\omega k))} = P(\omega_k) e^{j(\lambda(\omega k) + \Delta\lambda(\omega k))} * d(\omega_k) e^{j(\alpha(\omega k))} * PR(\omega_k)_{EST}$$

So plugging in the value of $PR(\omega_k)_{EST}$ we get $$S(\omega_k)_{ch\_out} = P(\omega_k)e^{j(\lambda(\omega k))}*d(\omega_k)e^{j(\alpha(\omega k))}*$$
$$C(\omega_k)e^{j(\beta(\omega k))}*(C(\omega_k)^{-1}*e^{-j(\gamma(\omega k))})*$$
$$(1-C(\omega_k)^{-1}\Delta C(\omega_k)+j*\Delta\gamma(\omega_k))$$

But the signal as read by the receiver 9 has a different phase as it reads the phases of different received frequencies with respect to $\eta(\omega_{kref})$ phase distorted through the channel i.e. $e^{j(\eta(\omega kref))}*e^{j(\beta(\omega kref))}=e^{j(\eta(\omega kref)+\beta(\omega kref))}$. Note that $\eta(\omega_{kref})=\lambda(\omega_k)$ which has no data is put on it i.e. it is always modulated with 1+j*0. (or some predetermined complex point, essentially it can carry no information, the choice of 1+j*0 only simplifies calculation)Thus (note that the jitter in $\lambda(\omega_k)$ is also being considered):

$$S(\omega_k)_{receiver\ 9\_read} = S(\omega_k)_{ch\_out}*e^{-j(\lambda(kref)+\beta(\omega kref))}$$

or expressed in detail:

$$S(\omega_k)_{receiver\ 9\_read} = P(\omega_k)e^{j(\lambda(\omega k))}*d(\omega_k)e^{j(\alpha(\omega k))}*$$
$$C(\omega_k)e^{j(\beta(\omega k))}*(C(\omega_k)^{-1}*e^{-j(\gamma(\omega k))})*(1-$$
$$C(\omega_k)^{-1}\Delta C(\omega_k)+j*\Delta\gamma(\omega_k))*e^{-j(\lambda(\omega kref)+\beta(\omega kref))}$$

put $\gamma(\omega k)=(\beta(\omega k)-\beta(\omega kref))$ and the expression simplifies to $$S(\omega_k)_{receiver\ 9\_read} = P(\omega_k)e^{j(\lambda(\omega k)-\lambda(\omega kref))}*$$
$$d(\omega_k)e^{j(\alpha(\omega k))}*(1-C(\omega_k)^{-1}\Delta C(\omega_k)+j*\Delta\gamma(\omega_k))$$

Further we multiply $S(\omega_k)_{receiver\ 9\_read}$ by $e^{-\phi(\omega k\_kref)avg}$ and $1/P(\omega_k)_{avg}$, which the transmitter 10 communicated to the receiver 9 during the handshake session. Thus:

$$(d(\omega_k)e^{j(\alpha(\omega k))})_{EST}=(P(\omega_k)/P(\omega_k)_{avg})*d(\omega_k)e^{j(\alpha(\omega k))}*$$
$$e^{j(\lambda(\omega k)-\lambda(\omega kref))-\phi(\omega k\_kref)avg}*(1-$$
$$C(\omega_k)^{-1}\Delta C(\omega_k)+j*\sigma_{\phi(\omega k\_kref)})$$

Rearranging after plugging $P(\omega_k)=P(\omega_k)_{avg}+\Delta P(\omega_k)$, where $\Delta P(\omega_k)$ and $\Delta\lambda(\omega k\_kref)$ $$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg})*e^{j(\lambda(\omega k)-\lambda(\omega kref))-\phi(\omega k\_kref)avg}*$$
$$(1-C(\omega_k)^{-1}\Delta C(\omega_k)+j*\sigma_{\phi(\omega k\_kref)})$$

To see the effect of the rms values of the amplitude and phase jitters we get:

$$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg})*e^{j(\Delta\lambda(\omega k\_kref))}*(1-C(\omega_k)^{-1}\Delta C(\omega_k)+$$
$$j*\Delta\gamma(\omega_k))$$

assuming $\sin(\Delta\gamma(\omega k\_kref))\sim\Delta\lambda(\omega k\_kref)$ $$(d(\omega_k)e^{j(\alpha(\omega k))})_{EST}=d(\omega_k)e^{j(\alpha(\omega k))}*(1+\Delta P(\omega_k)/P(\omega_k)$$
$$_{avg})*(1+j*\Delta\lambda(\omega k\_kref))*(1-C(\omega_k)^{-1}\Delta C(\omega_k)+$$
$$j*\Delta\gamma(\omega_k))$$

neglecting second and other higher order terms $$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg}-\Delta C(\omega_k)/C(\omega_k)_{avg}+$$
$$j*(\Delta\lambda(\omega_{k\_kref})+\Delta\gamma(\omega_k))]$$

Rearranging after assuming $(\Delta\lambda(\omega_{k\_kref})+\Delta\gamma(\omega_k))<<1$ (in radians)

$$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg}-\Delta C(\omega_k)/C(\omega_k))*[1+j*\{(\Delta\lambda(\omega_{k\_kref})+$$
$$\Delta\gamma(\omega_k))/(1+\Delta P(\omega_k)/P(\omega_k)_{avg}-\Delta C(\omega_k))\}]$$
$$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg}-\Delta C(\omega_k))*[\exp\{(\Delta\lambda(\omega_{k\_kref})+\Delta\gamma(\omega_k))/$$
$$(1+\Delta P(\omega_k)/P(\omega_k)_{avg}-\Delta C(\omega_k)/C(\omega_k))\}]$$

Writing the first order binomial for the denominator in the phase term

Assuming that $\Delta P(\omega_k)/P(\omega_k)_{avg}$ and $\Delta C(\omega_k)/C(\omega_k)$ are small:

$$(d(\omega_k)e^{j(\alpha(\omega k))})_{EST}=d(\omega_k)e^{j(\alpha(\omega k))}*(1+\Delta P(\omega_k)/$$
$$P(\omega_k)_{avg}-\Delta C(\omega_k)/C(\omega_k))*$$
$$e^{j*(\Delta\lambda(\omega k\_kref)+\Delta\gamma(\omega k)-\Delta P(\omega k)/P(\omega k)avg+\Delta C(\omega k)/C(\omega k))}$$

Thus we have an approximate expression for the estimated data point in terms of the % errors due to jitters in phase and amplitude.

Taking Expectation after multiplying by the complex conjugate:

$$E[(d(\omega_k)_{EST})^2]=(d(\omega_k))^2*(1+\sigma_P(\omega_k)/(P(\omega_k)_{avg})^2+$$
$$(\Delta C(\omega_k)/C(\omega_k))^2)$$

Computing the rms values for amplitude to $1^{st}$ order terms in binomial expansion (assuming that the jitters and estimation errors are small compared to the actual values) and accounting for the fact that rms errors in each term could be +ve or −ve, so we take the worst case scenario and obtain a bound on the rms error in amplitude estimation of the data point:

$$[d(\omega_k)_{EST}-(d(\omega_k))]_{rms}<=\sigma_P(\omega_k)/$$
$$(2*(P(\omega_k)_{avg})^2)+(1/2)*(\Delta C(\omega_k)/C(\omega_k))^2$$

applying the appropriate rms values for amplitude and phase jitters, the mean value for the amplitude and the estimation errors in the amplitude and phase of the channel spectrum in the following expression:

$$(e^{j(\alpha(\omega k))})_{EST}=e^{j(\alpha(\omega k))}*$$
$$e^{j*(\Delta\lambda(\omega k\_kref)+\Delta\gamma(\omega k)-\Delta P(\omega k)/P(o)k)avg+\Delta C(\omega k)/C(\omega k))}$$

we get a bound on the rms of the phase error in the estimate:

$$[(\alpha(\omega k))_{EST}-(\alpha(\omega k))]_{rms}<=(\sigma_{\delta(\omega k\_kref)}+|\Delta\gamma(\omega k)|+(\sigma_P$$
$$(\omega_k))^{1/2}/(P(\omega_k)_{avg})+|\Delta C(\omega k)/C(\omega k)|)$$

Thus we have demonstrated the functioning of a Type-II system under nonideal conditions. The analysis of Type-I Systems under nonideal conditions proceeds on exactly similar lines from the ideal analysis, as was done in this section for Type-II systems. Just that the data-point estimation errors will be higher as $|\Delta\gamma(\omega k)|$ and $|\Delta C(\omega k)/C(\omega k)|$, the estimation errors in channel spectral parameters will be higher.

What is claimed is:

1. A method for improving communication in an optical communication system having spectrally shaped pulses comprising the steps of:
    sending at least one first spectrally shaped pulse over a channel connecting a transmitter and a receiver;
    individually reading at least a phase component of the spectrally shaped pulse received at the receiver;
    comparing at least the phase component of the spectrally shaped pulse received at the receiver to a phase component of a predetermined spectrally shaped pulse;
    obtaining a preemphasis coefficient that describes the difference between at least the phase component of the spectrally shaped pulse received at the receiver to the phase component of the predetermined spectrally shaped pulse, the preemphasis coefficient representing an approximation of the phase distortion in the communication channel between the transmitter and the receiver for a particular frequency; and
    modulating a frequency component of a second spectrally shaped pulse by multiplying the second spectrally shaped pulse with the preemphasis coefficient before sending the second spectrally shaped pulse to the receiver, the multiplication being capable of adjusting both an amplitude and a phase of the one or more frequency components.

2. The method of claim 1, wherein the method is repeated N times to obtain N different preemphasis coefficients, each of the N different preemphasis coefficients being averaged.

* * * * *